US012753972B2

(12) United States Patent
Aizawa

(10) Patent No.: US 12,753,972 B2
(45) Date of Patent: *Oct. 6, 2026

(54) DIELECTRIC HEATING DEVICE

(71) Applicant: SEIKO EPSON CORPORATION, Tokyo (JP)

(72) Inventor: Tadashi Aizawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 574 days.

This patent is subject to a terminal disclaimer.

(21) Appl. No.: 18/349,991

(22) Filed: Jul. 11, 2023

(65) Prior Publication Data

US 2024/0019210 A1 Jan. 18, 2024

(30) Foreign Application Priority Data

Jul. 13, 2022 (JP) ................................ 2022-112342

(51) Int. Cl.

*F26B 23/06* (2006.01)
*H05B 1/02* (2006.01)
*H05B 3/03* (2006.01)

(52) U.S. Cl.

CPC ............ *F26B 23/06* (2013.01); *H05B 1/023* (2013.01); *H05B 3/03* (2013.01)

(58) Field of Classification Search

CPC ........... F26B 23/06; H05B 1/023; H05B 3/03
USPC ........................................................... 34/553
See application file for complete search history.

(56) References Cited

U.S. PATENT DOCUMENTS 3,470,621 A * 10/1969 Bennett ..................... F26B 3/34 219/773
5,950,325 A * 9/1999 Mehdizadeh ........... F26B 3/343 34/502
6,098,306 A * 8/2000 Ramsey ................ F26B 25/006 134/30
6,185,839 B1 * 2/2001 Kholodenko ....... H01J 37/3244 34/210
6,944,970 B2 * 9/2005 Silverbrook ........... B41J 15/044 34/640

(Continued)

FOREIGN PATENT DOCUMENTS

CN 117412427 A * 1/2024 .............. F26B 23/06
EP 3023693 A1 * 5/2016 ........... F23G 5/0276

(Continued)

*Primary Examiner* — Stephen M Gravini
(74) *Attorney, Agent, or Firm* — Spencer Fane LLP

(57) ABSTRACT

A dielectric heating device includes: a transport unit configured to transport a medium in a transport direction; an electrode unit configured to dry the medium transported by the transport unit by dielectric heating, the electrode unit including a first electrode and a second electrode that face the medium; a voltage application unit configured to apply an AC voltage to the first electrode and the second electrode; and a control unit configured to control the transport unit. The second electrode includes a first portion and a second portion that sandwich the first electrode in the transport direction. The first portion is disposed upstream of the second portion in the transport direction. The first electrode and the second electrode are formed such that a heating amount of the medium by an electric field formed between the first electrode and the first portion is larger than a heating amount of the medium by an electric field formed between the first electrode and the second portion.

5 Claims, 6 Drawing Sheets

(56) References Cited

U.S. PATENT DOCUMENTS

| | | | | |
|---|---|---|---|---|
| 7,353,623 | B2 * | 4/2008 | Asuke | F26B 11/18 34/80 |
| 7,367,138 | B2 * | 5/2008 | Sogard | G03F 7/70916 34/275 |
| 9,283,779 | B2 * | 3/2016 | Hobo | B41J 11/0085 |
| 10,344,972 | B2 * | 7/2019 | Lai | F23G 5/027 |
| 10,486,440 | B2 * | 11/2019 | Hirano | B41J 11/007 |
| 10,487,443 | B1 * | 11/2019 | D'Anna | F26B 3/347 |
| 10,661,584 | B2 * | 5/2020 | Hirashima | B41J 15/046 |
| 12,228,338 | B2 * | 2/2025 | Chun | H05B 6/80 |
| 12,269,254 | B2 * | 4/2025 | Aizawa | B41J 11/00218 |
| 12,281,364 | B2 * | 4/2025 | Polato | C14B 1/58 |
| 2005/0163523 | A1 | 7/2005 | Omata et al. | |
| 2017/0266986 | A1 | 9/2017 | Yamada | |
| 2020/0406607 | A1 | 12/2020 | Aizawa | |
| 2022/0063274 | A1 | 3/2022 | Sasaki et al. | |
| 2024/0019210 | A1 * | 1/2024 | Aizawa | F26B 23/06 |

FOREIGN PATENT DOCUMENTS

| | | | | | |
|---|---|---|---|---|---|
| JP | 2006-258831 | A | | 9/2006 | |
| JP | 2011-037228 | A | | 2/2011 | |
| JP | 2017-165000 | A | | 9/2017 | |
| JP | 2018-009754 | A | | 1/2018 | |
| JP | 2018-130944 | A | | 8/2018 | |
| JP | 2020-062820 | A | | 4/2020 | |
| JP | 2021-008056 | A | | 1/2021 | |
| JP | 2022-039286 | A | | 3/2022 | |
| JP | 2024010821 | A | * | 1/2024 | F26B 23/06 |
| KR | 10-2005-0076822 | A | | 7/2005 | |
| KR | 20190001537 | A | * | 1/2019 | A61J 3/007 |

* cited by examiner

DIELECTRIC HEATING DEVICE

The present application is based on, and claims priority from JP Application Serial Number 2022-112342, filed Jul. 13, 2022, the disclosure of which is hereby incorporated by reference herein in its entirety.

BACKGROUND

1. Technical Field

The present disclosure relates to a dielectric heating device.

2. Related Art

Regarding a dielectric heating device, JP-A-2018-9754 discloses a device that heats and dries a transported object by a dielectric heating method by applying a high frequency electric field to the transported object by using a plurality of electrodes.

In the device that heats and dries the transported object as in JP-A-2018-9754, for example, when a transporting speed is relatively slow or a size of the electrode is relatively large, the transported object may be excessively dried downstream in a transport direction.

SUMMARY

According to an aspect of the present disclosure, a dielectric heating device is provided. The dielectric heating device includes: a transport unit configured to transport a medium in a transport direction; an electrode unit configured to dry the medium transported by the transport unit by dielectric heating, the electrode unit including a first electrode and a second electrode that face the medium; a voltage application unit configured to apply an AC voltage to the first electrode and the second electrode; and a control unit configured to control the transport unit. The second electrode includes a first portion and a second portion that sandwich the first electrode in the transport direction. The first portion is disposed upstream of the second portion in the transport direction. The first electrode and the second electrode are formed such that a heating amount of the medium by an electric field formed between the first electrode and the first portion is larger than a heating amount of the medium by an electric field formed between the first electrode and the second portion.

DESCRIPTION OF EXEMPLARY EMBODIMENTS

A. First Embodiment

Figure 1:
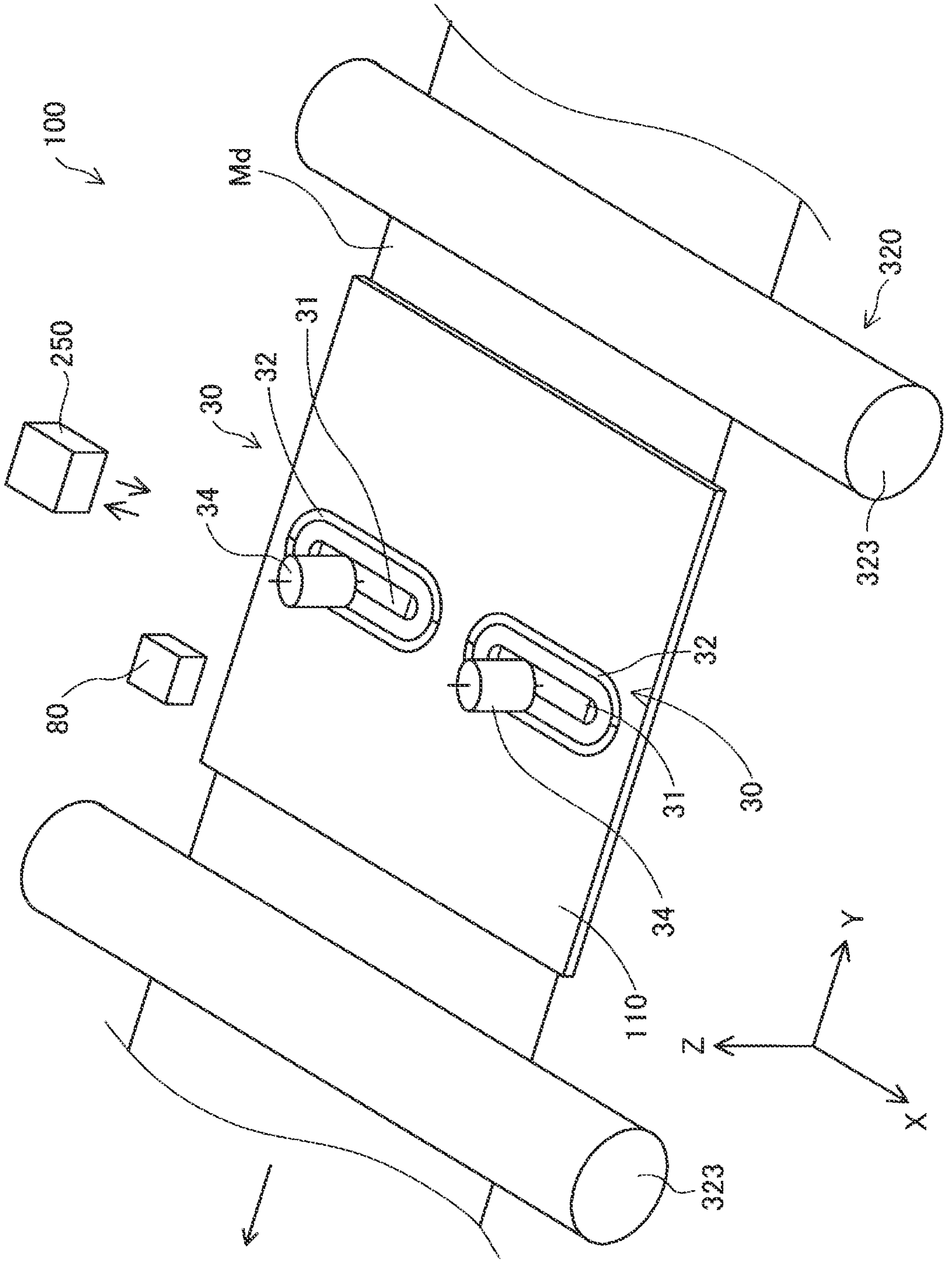
FIG. 1 is a schematic view showing a schematic configuration of a dielectric heating device.

FIG. 1 is a schematic view showing a schematic configuration of a dielectric heating device 100 as a first embodiment. FIG. 1 shows arrows indicating X, Y, and Z directions orthogonal to one another. The X direction and the Y direction are directions parallel to a horizontal plane, and the Z direction is a direction along a vertically upward direction. The arrows indicating the X, Y, and Z directions are appropriately shown in other drawings such that the shown directions correspond to those in FIG. 1. In the following description, when orientation of a direction is specified, a direction indicated by an arrow in each drawing is referred to as "+", a direction opposite thereto is referred to as "−", and a positive or negative sign is used in combination with a direction notation. Hereinafter, a +Z direction is also referred to as "upper", and a −Z direction is also referred to as "lower". In the present specification, the term "orthogonal" includes a range of 90°±10°. Further, a plane along the X and Y directions is also referred to as an "XY plane".

The dielectric heating device 100 includes a transport unit 320 that transports a medium Md, electrode units 30 each of which dries the medium Md by dielectric heating, a voltage application unit 80 that applies an AC voltage to the electrode units 30, and a control unit 250. The dielectric heating device 100 dries the medium Md by heating the medium Md by an AC electric field generated from the electrode unit 30 while transporting the medium Md by the transport unit 320. The term "heating the medium Md by an AC electric field" includes not only heating the medium Md itself by the AC electric field but also heating an adhering substance such as a liquid or a solid adhering to the medium Md by the AC electric field. The electrode unit 30 is also referred to as a heater.

Examples of the medium Md include a sheet, a cloth, and a film. The cloth used as the medium Md is formed by weaving, for example, fibers such as cotton, hemp, polyesters, silk, and rayon, or fibers obtained by blending these fibers. In the embodiment, a sheet-shaped cotton cloth is used as the medium Md.

In the embodiment, the dielectric heating device 100 dries the medium Md coated with a liquid discharged by a liquid discharge device (not shown). Examples of the liquid include various inks containing water as a main component. In the embodiment, an aqueous ink containing water as a main component is used as the liquid. In the present specification, a main component of the liquid refers to a substance having a mass fraction of 50% or more among substances contained in the liquid. In another embodiment, any liquid such as various coloring materials, electrode materials, samples such as bioorganic substances and inorganic substances, lubricating oils, resin liquids, and etchants may be used as the liquid in addition to the ink.

The ink used as the liquid in the embodiment is a pigment ink containing a resin. The resin contained in the ink has a function of firmly fixing a pigment on the medium Md via the resin. Such a resin is used, for example, in a state where a resin that is hardly soluble or insoluble in a solvent such as water is dispersed in the solvent in a form of fine particles, that is, in an emulsion state or a suspension state. Examples of such a resin include an acrylic resin, a styrene-acrylic resin, a fluorene resin, a urethane resin, a polyolefin resin, a rosin-modified resin, a terpene resin, a polyester resin, a polyamide resin, an epoxy resin, a vinyl chloride resin, a vinyl chloride-vinyl acetate copolymer, and an ethylene-vinyl acetate resin. Two or more of these resins may be used in combination. Such a resin is also referred to as a resin.

The transport unit 320 is implemented as a roller mechanism that transports the medium Md by driving rollers 323. The transport unit 320 drives the rollers 323 by a driving force of a driving unit (not shown) implemented by a motor or the like under control of the control unit 250. In the embodiment, the transport unit 320 transports the medium Md in a −Y direction. In another embodiment, for example, the transport unit 320 may be implemented as a belt mechanism that transports the medium Md by driving a belt.

The control unit 250 is implemented by a computer including one or a plurality of processors, a storage device, and an input and output interface for inputting and outputting signals to and from an outside. In another embodiment, for example, the control unit 250 may be implemented by a combination of a plurality of circuits.

The voltage application unit 80 is electrically coupled to the electrode unit 30, and applies an AC voltage having a predetermined driving frequency $f_0$ to a first electrode 31 and a second electrode 32 of the electrode unit 30 to be described later. In the embodiment, the voltage application unit 80 is implemented as a high frequency power supply including a high frequency voltage generation circuit, and includes a crystal oscillator, a phase locked loop (PLL) circuit, and a power amplifier, which are not shown. In another embodiment, for example, the voltage application unit 80 may be implemented as an inverter including a switching circuit including a switching element such as a transistor. One of potentials applied to the first electrode 31 and the second electrode 32 may be a reference potential. The reference potential is a constant potential serving as a reference of a high frequency voltage, and is, for example, a ground potential.

In the embodiment, the high frequency voltage is applied to each electrode of the electrode unit 30. In the present specification, the term "high frequency" refers to a frequency of 1 MHz or more. More specifically, in the embodiment, as the driving frequency $f_0$, 13.56 MHz which is one of industrial scientific and medical (ISM) bands is used. Since a dielectric loss tangent of water is maximized in the vicinity of 20 GHz, the medium Md can be heated more efficiently by applying a high frequency voltage at 2.45 GHz or 5.8 GHz in the ISM bands to each electrode of the electrode unit 30. On the other hand, from a viewpoint of heating the ink, even when the driving frequency $f_0$ is relatively low, for example, 13.56 MHz or 40.68 MHz, excellent heating efficiency can also be obtained. This is because, when the driving frequency $f_0$ is 13.56 MHz or 40.68 MHz, the dielectric loss tangent of the water in the ink is low, but Joule heat is likely to be generated due to an electric resistance of a coloring matter component or the like in the ink.

Figure 2:
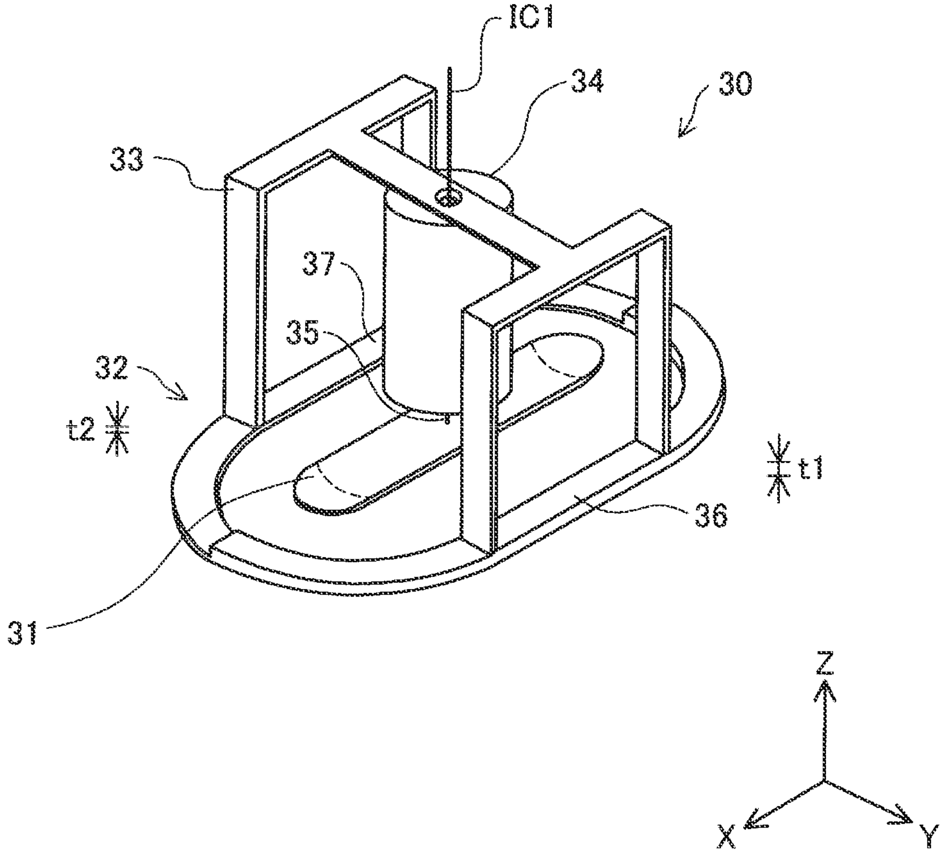
FIG. 2 is a perspective view showing a schematic configuration of an electrode unit according to a first embodiment.

FIG. 2 is a perspective view showing a schematic configuration of the electrode unit 30 according to the embodiment. As shown in FIG. 1, in the embodiment, the dielectric heating device 100 includes two electrode units 30 arranged along the X direction. As shown in FIGS. 1 and 2, the electrode unit 30 includes the first electrode 31 and the second electrode 32. The electrode unit 30 according to the embodiment further includes a coil 34. In another embodiment, the number of electrode units 30 may be one or three or more. Further, the electrode units 30 may not be arranged along the X direction, and may be freely arranged.

The first electrode 31 and the second electrode 32 face the medium Md transported in a transport direction. In the embodiment, the transport direction is the −Y direction. Therefore, in the embodiment, a +Y direction side corresponds to an upstream in the transport direction, and a −Y direction side corresponds to a downstream in the transport direction. Hereinafter, a direction in which the first electrode 31 and the second electrode 32 face the medium Md is also referred to as a facing direction. The facing direction includes both a direction on one side along the same axis and a direction opposite thereto, and is the Z direction in the embodiment.

The first electrode 31 and the second electrode 32 are conductors, and are formed of, for example, a metal, an alloy, or a conductive oxide. The first electrode 31 and the second electrode 32 may be formed of the same material or different materials. For example, to maintain a posture and strength of the first electrode 31 and the second electrode 32, the first electrode 31 and the second electrode 32 may be disposed on a substrate or the like formed of a material having a low dielectric loss tangent or low conductivity or may be supported by another member.

The first electrode 31 and the second electrode 32 are disposed such that a shortest distance between the first electrode 31 and the second electrode 32 is equal to or less than one-tenth of a wavelength of an electromagnetic field output from the electrode unit 30. As shown in FIG. 2, the first electrode 31 according to the embodiment has a boat shape in which the X direction is a longitudinal direction and the Y direction is a lateral direction. A lower surface of the first electrode 31 has a curved shape protruding in the −Z direction. When viewed along the Z direction, the first electrode 31 has an oval shape elongated in the X direction. The second electrode 32 has an oval annular shape that is flat in the X direction and the Y direction and that is elongated in the X direction. When viewed along the Z direction, the second electrode 32 is disposed to surround a periphery of the first electrode 31. As to be described later, the second electrode 32 includes a first portion 36 and a second portion 37 sandwiching the first electrode 31 therebetween in the transport direction.

As shown in FIGS. 1 and 2, the first electrode 31 and the second electrode 32 are both disposed on a substrate 110 disposed parallel to the XY plane. More specifically, the first electrode 31 is disposed such that a central part of the lower surface of the first electrode 31 in the X direction and the Y direction is in contact with an upper surface of the substrate 110. The second electrode 32 is disposed such that a lower surface of the second electrode 32 is in contact with the upper surface of the substrate 110. Therefore, in the embodiment, the central part of the lower surface of the first electrode 31 and the lower surface of the second electrode 32 are disposed at the same plane.

As shown in FIG. 1, in the embodiment, the first electrode 31 and the second electrode 32 are disposed above the medium Md. Therefore, in the embodiment, the lower surfaces of the first electrode 31 and the second electrode 32 face an upper surface of the medium Md. The substrate 110 described above is disposed between the medium Md and the first electrode 31 and the second electrode 32.

In the embodiment, the substrate 110 is formed of glass. Due to the substrate 110, a liquid such as an ink applied to the medium Md or a fluff of the medium Md when the medium Md is a cloth is prevented from adhering to the first electrode 31 and the second electrode 32. In another embodiment, the substrate 110 may be formed of, for example, alumina.

The description will be given returning to FIG. 2. In the embodiment, the first electrode 31 is electrically coupled to the voltage application unit 80 via an electric wire 35, the coil 34, and an internal conductor IC1 of a coaxial cable. The second electrode 32 is electrically coupled to the voltage application unit 80 via a coupling member 33 disposed over the second electrode 32, an external conductor of a coaxial cable (not shown), or the like.

When the AC voltage at the driving frequency $f_0$ is applied to the first electrode 31 and the second electrode 32, an electromagnetic field having a wavelength corresponding to the driving frequency $f_0$ is generated from the first electrode 31 and the second electrode 32. An intensity of the electromagnetic field is extremely large in the vicinity of the first electrode 31 and the second electrode 32, and is extremely small at a location far away from the first electrode 31 and the second electrode 32. Hereinafter, the electromagnetic field generated in the vicinity of the first electrode 31 and the second electrode 32 by the application of the AC voltage is also referred to as a "near electromagnetic field". The expression "in the vicinity of" the first electrode 31 and the second electrode 32 refers to a range in which a distance from the first electrode 31 and the second electrode 32 is equal to or smaller than ½π of the wavelength of the generated electromagnetic field. A range farther away than the "vicinity" is also referred to as a "far location". An electromagnetic field generated far from the first electrode 31 and the second electrode 32 by the application of the AC voltage is also referred to as a "far electromagnetic field". The far electromagnetic field corresponds to an electromagnetic field used in communication by a general communication antenna or the like. An electric field formed in a region in the vicinity of the first electrode 31 and the second electrode 32 is also referred to as a near electric field.

As described above, the first electrode 31 and the second electrode 32 are disposed such that the shortest distance therebetween is equal to or smaller than one-tenth of the wavelength of the electromagnetic field. Accordingly, a density of the electromagnetic field generated from the first electrode 31 and the second electrode 32 can be attenuated in the vicinity of the first electrode 31 and the second electrode 32. Therefore, by appropriately maintaining a distance between the medium Md and the first electrode 31 and the second electrode 32, radiation of the far electromagnetic field from the first electrode 31 and the second electrode 32 can be prevented while efficiently heating the medium Md by the electric field generated in the vicinity of the first electrode 31 and the second electrode 32. In particular, in the embodiment, since the second electrode 32 is disposed to surround the periphery of the first electrode 31 when viewed along the Z direction, the radiation of the far electromagnetic field from the first electrode 31 and the second electrode 32 can be further prevented.

In the embodiment, one end of the coil 34 is electrically coupled in series to the first electrode 31 via the electric wire 35, and the other end of the coil 34 is electrically coupled in series to the voltage application unit 80 shown in FIG. 1. In the embodiment, the coil 34 is implemented by a solenoid coil and is disposed such that a length direction thereof is along the Z direction. A shape, a length, a cross-sectional area, the number of turns, a material, and the like of the coil 34 are selected according to, for example, the driving frequency $f_0$ to achieve impedance matching between the electrode unit 30 and the voltage application unit 80. In another embodiment, the one end of the coil 34 may be coupled in series to the second electrode 32 instead of the first electrode 31.

When the voltage application unit 80 applies the AC voltage to the electrode unit 30, a high voltage is generated at the one end of the coil 34. Accordingly, the intensity of the electric field generated from the first electrode 31 and the second electrode 32 can be increased. The coil 34 is preferably disposed such that a distance between the one end of the coil 34 and the first electrode 31 is as small as possible. When the distance between the one end of the coil 34 and the first electrode 31 is large, the high voltage generated at the one end of the coil 34 may generate an electric field that does not contribute to the heating of the medium Md between the coil 34 and the first electrode 31 or between the electric wire 35 and the second electrode 32, and an effect of increasing the intensity of the near electric field generated from the first electrode 31 and the second electrode 32 may be reduced. In contrast, by reducing the distance between the one end of the coil 34 and the first electrode 31, the generation of the electric field that does not contribute to the heating of the medium Md can be prevented, and thus an intensity of an electric field that contributes to the heating of the medium Md can be effectively increased. In another embodiment, for example, by forming the first electrode 31 in a meander shape, the first electrode 31 may exhibit the same function as the coil 34.

Figure 3:
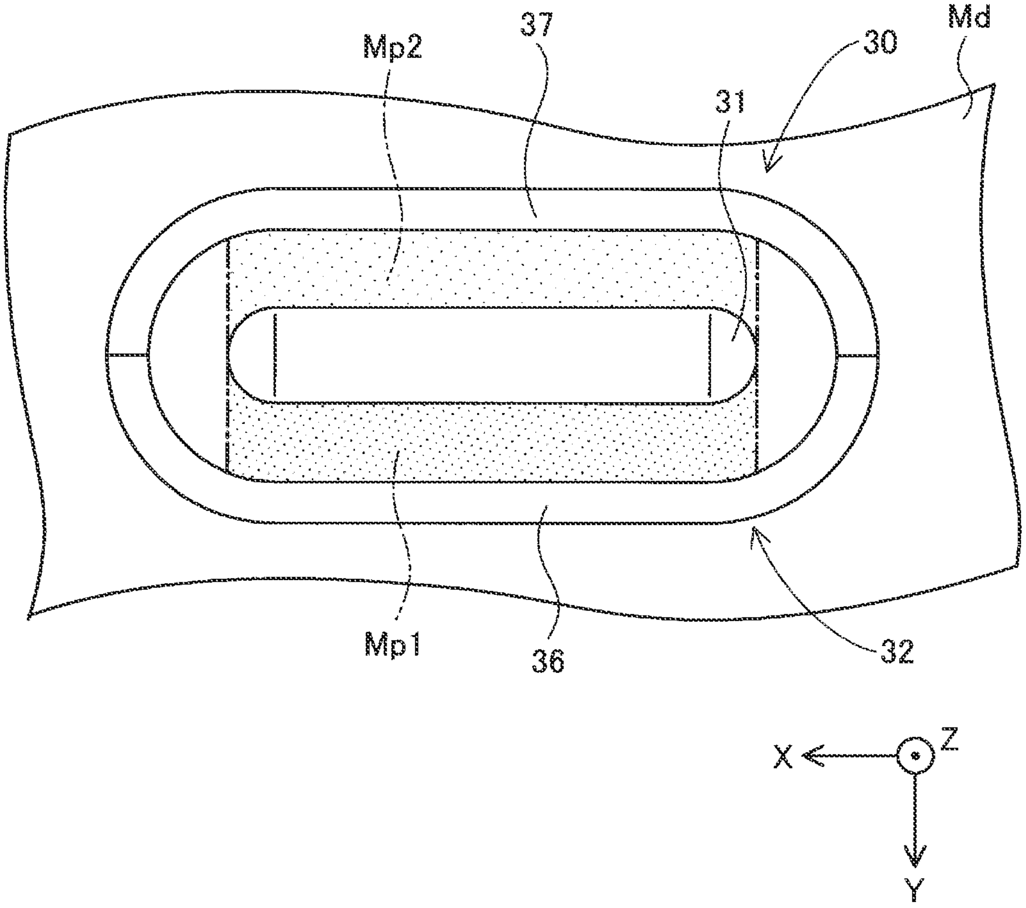
FIG. 3 is a top view showing a first electrode, a second electrode, and a medium.

FIG. 3 is a top view showing the first electrode 31, the second electrode 32, and the medium Md according to the embodiment. In FIG. 3, the substrate 110 is omitted. As shown in FIGS. 2 and 3, the first portion 36 of the second electrode 32 is disposed upstream of the second portion 37 in the transport direction. More specifically, in the embodiment, the first portion 36 is a portion of the second electrode 32 formed in the annular shape surrounding the first electrode 31 as described above located on the +Y direction side relative to the first electrode 31. The second portion 37 is a portion of the second electrode 32 located on the −Y direction side relative to the first electrode 31.

In the embodiment, a thickness t1 of the first portion 36 is larger than a thickness t2 of the second portion 37. In the present specification, the thickness t1 indicates an average value of thicknesses of the first portion 36, and the thickness t2 indicates an average value of thicknesses of the second portion 37. An average value of thicknesses in a certain portion is measured by measuring thicknesses at 10 or more points in the portion and calculating arithmetic mean of the thicknesses. In the embodiment, each of the first portion 36 and the second portion 37 is formed to have a uniform thickness in the Z direction.

The first electrode 31 and the second electrode 32 are formed such that a first heating amount of the electrode unit 30 is larger than a second heating amount of the electrode unit 30. The first heating amount refers to a heating amount of the medium Md by a first electric field representing the near electric field formed between the first electrode 31 and the first portion 36. The second heating amount refers to a heating amount of the medium Md by a second electric field representing the near electric field formed between the first electrode 31 and the second portion 37.

When comparing the first heating amount and the second heating amount, for example, when a cotton cloth with a substantially uniform thickness of a liquid adhering to the entire surface is prepared as the medium Md, a temperature of a first medium portion Mp1 and a temperature of a second medium portion Mp2 when the medium Md is heated by the electrode unit 30 without being transported are compared. More specifically, when the first heating amount is larger than the second heating amount, the temperature of the first medium portion Mp1 when the medium Md is heated in this manner is larger than the temperature of the second medium portion Mp2. As indicated by a one-dot chain line and hatching in FIG. 3, the first medium portion Mp1 refers to a portion of the medium Md located between the first electrode 31 and the first portion 36 when viewed along the Z direction. Similarly, the second medium portion Mp2 refers to a portion of the medium Md located between the first electrode 31 and the second portion 37 when viewed along the Z direction.

A heating amount when a certain portion of the medium Md is heated by the electrode unit 30 increases as the intensity of the near electric field acting on the portion increases. Accordingly, by further increasing the intensity of the electric field acting on the liquid adhering to the first medium portion Mp1 or by further decreasing the intensity of the electric field acting on the liquid adhering to the second medium portion Mp2, the first heating amount can be relatively increased with respect to the second heating amount. Increasing the intensity of the near electric field acting on the liquid adhering to a certain portion of the medium Md corresponds to increasing a density of electric force lines passing through the liquid when the near electric field is represented by the electric force lines. In particular, the liquid adhering to the sheet-shaped medium Md is generally distributed to spread on the medium Md along a surface direction of the medium Md. Therefore, when the density of the electric force lines along the surface direction of the medium Md in the vicinity of the portion of the medium Md is increased, a heating amount of the certain portion can be effectively increased.

Figure 4:
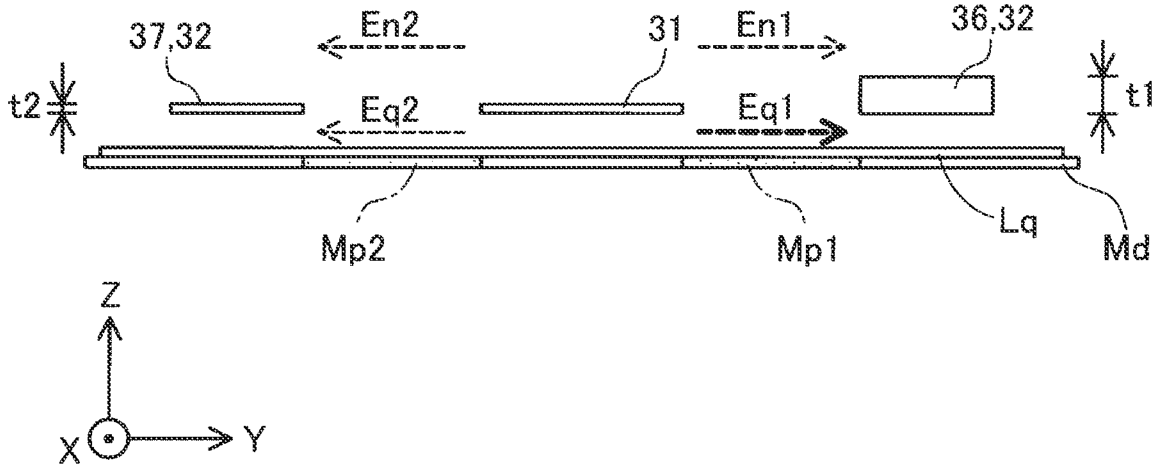
FIG. 4 is a schematic view illustrating a thickness of a first portion and a thickness of a second portion.

FIG. 4 is a schematic view illustrating the thickness t1 of the first portion 36 and the thickness t2 of the second portion 37. FIG. 4 schematically shows a state where a liquid Lq adhering to the medium Md is heated by the electrode unit 30. In FIG. 4, an electric field Eq1 acting on the liquid Lq adhering to the first medium portion Mp1 and an electric field Eq2 acting on the liquid Lq adhering to the second medium portion Mp2 are represented by broken lines. In FIG. 4, the thicker the broken line is, the larger the intensity of the electric field indicated by the broken line is. As shown in FIGS. 2 and 4, in the embodiment, the second electrode 32 is formed such that the thickness t1 of the first portion 36 in the Z direction is larger than the thickness t2 of the second portion 37 in the Z direction, thereby implementing the first heating amount larger than the second heating amount. More specifically, as shown in FIG. 4, in the embodiment, by setting the thickness t1 larger than the thickness t2, the intensity of the electric field Eq1 is larger than the intensity of the electric field Eq2.

Figure 5:
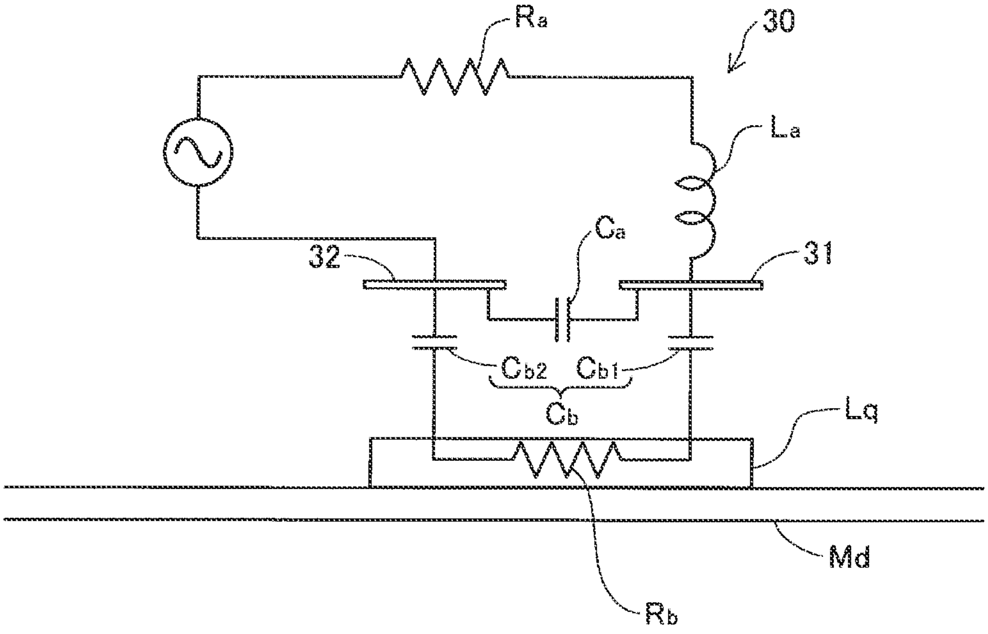
FIG. 5 is a schematic view illustrating a circuit formed by the electrode unit and the medium.

FIG. 5 is a schematic view illustrating a circuit formed by the electrode unit 30 and the liquid Lq adhering to the medium Md according to the embodiment. As shown in FIG. 5, each of the first electrode 31 and the second electrode 32 of the electrode unit 30 can be regarded as an electrode plate constituting one capacitor.

A resistance $R_a$ shown in FIG. 5 represents a resistance of the electrode unit 30. The resistance $R_a$ includes an internal resistance of the voltage application unit 80 and a parasitic resistance of the coil 34. An inductance $L_a$ represents an inductance of the electrode unit 30. The inductance $L_a$ includes an inductance of the coil 34 and a parasitic inductance of each electrode of the electrode unit 30. A capacitance $C_a$ represents a capacitance of the electrode unit 30. The capacitance $C_a$ includes a parasitic capacitance of the coil 34 and a capacitance between the electrodes of the electrode unit 30. A resistance $R_b$ represents an electrical resistance of the liquid Lq adhering to the medium Md. A capacitance $C_{b1}$ represents a parasitic capacitance between the first electrode 31 and the liquid Lq. A capacitance $C_{b2}$ represents a parasitic capacitance between the second electrode 32 and the liquid Lq. A capacitance $C_b$ is represented as a sum of the capacitances $C_{b1}$ and $C_{b2}$. A sum of the capacitance $C_a$ and the capacitance $C_b$ corresponds to a capacitance of the electrode unit 30.

A resonance frequency $f_1$ of the electrode unit 30 when drying the liquid applied to the medium Md is represented as a resonance frequency of the electrode unit 30 in the circuit formed by the electrode unit 30 and the liquid Lq adhering to the medium Md shown in FIG. 5. Since the capacitance $C_a$ decreases as a moisture content of the medium Md decreases with a progress of drying, the resonance frequency $f_1$ increases with the progress of drying. Hereinafter, such a change in the resonance frequency $f_1$ with the progress of drying is also referred to as a shift of the resonance frequency $f_1$. When a difference between the driving frequency $f_0$ and the resonance frequency $f_1$ changes due to the shift of the resonance frequency $f_1$, an impedance of the electrode unit 30 changes. Therefore, the shift of the resonance frequency $f_1$ affects the heating amount of the entire electrode unit 30. For example, in a case of setting the driving frequency $f_0$ to coincide with the resonance frequency $f_1$ when the moisture content of the medium Md is sufficiently large, the difference between the resonance frequency $f_1$ and the driving frequency $f_0$ increases due to the shift of the resonance frequency $f_1$, and the impedance of the electrode unit 30 increases. Therefore, in this case, the shift of the resonance frequency $f_1$ contributes to reduction of the heating amount of the entire electrode unit 30.

In the embodiment, the electrode unit 30 is configured such that a first sensitivity is larger than a second sensitivity at the resonance frequency $f_1$. The first sensitivity refers to a sensitivity at the resonance frequency $f_1$ to a change in the moisture content of the medium Md between the first electrode 31 and the first portion 36. The second sensitivity refers to a sensitivity at the resonance frequency $f_1$ of the electrode unit 30 to a change in the moisture content of the medium Md between the second electrode 32 and the second portion 37. More specifically, the first sensitivity corresponds to a sensitivity at the resonance frequency $f_1$ to a change in a moisture content of the first medium portion Mp1. The second sensitivity corresponds to a sensitivity at the resonance frequency $f_1$ to a change in a moisture content of the second medium portion Mp2. As described above, the shift of the resonance frequency $f_1$ affects the heating amount of the entire electrode unit 30. Therefore, by setting the first sensitivity larger than the second sensitivity, the sensitivity to the change in the moisture content of the first medium portion Mp1 can be set larger than the sensitivity to the change in the moisture content of the second medium portion Mp2 of the heating amount of the entire electrode unit 30.

In the embodiment, a moisture content in a certain portion of the medium Md is represented as a mass of water contained per unit volume of the portion. In another embodiment, for example, a moisture content in a certain portion may be represented as a volume of water contained per unit volume of the portion, or may be represented as a ratio of a mass or a volume of water to a reference value of the mass or the volume.

When comparing the first sensitivity and the second sensitivity, first, a cotton cloth with a substantially uniform thickness of a liquid adhering to the entire surface is prepared as a first sample, and a first step of measuring a resonance frequency ft0 when the first sample is heated by the electrode unit 30 without being transported is executed. Next, a cotton cloth with a substantially uniform thickness of the liquid adhering to a surface excluding a portion corresponding to the first medium portion Mp1 is similarly prepared as a second sample, and a resonance frequency ft1 when the second sample is heated by the electrode unit 30 without being transported is measured. A difference between the resonance frequency ft1 and the resonance frequency ft0 corresponds to the first sensitivity. A cotton cloth with a substantially uniform thickness of the liquid adhering to a surface excluding a portion corresponding to the second medium portion Mp2 is similarly prepared as a third sample, and a resonance frequency ft2 when the medium Md is heated by the electrode unit 30 is measured similarly. A difference between the resonance frequency ft2 and the resonance frequency ft0 corresponds to the second sensitivity. When an ink is used as the liquid Lq as in the embodiment, the first sample can be prepared by, for example, performing solid printing with the liquid on the entire surface of the cotton cloth by using an inkjet printer. The solid printing refers to printing in which dots are formed on all pixels constituting an image to not leave a background color portion of the medium Md. Similarly, the second sample or the third sample can be prepared by performing solid printing with the liquid on the surface of the cotton cloth excluding the portion corresponding to the first medium portion Mp1 or the second medium portion Mp2. The resonance frequencies ft0 to ft2 are calculated based on, for example, the inductance and the capacitance of the electrode unit 30 measured by using a network analyzer.

As shown in FIG. 4, the first sensitivity can be increased by further increasing a ratio of the intensity of the electric field Eq1 acting on the first medium portion Mp1 to an intensity of an electric field En1 not acting on the first medium portion Mp1 in the first electric field. Further increasing the ratio of the intensity of the electric field Eq1 to the intensity of the electric field En1 corresponds to, when the first electric field is represented by electric force lines, increasing a ratio of electric force lines passing through the liquid Lq adhering to the first medium portion Mp1 to the electric force lines representing the first electric field. The second sensitivity can be further reduced by further reducing a ratio of the intensity of the electric field Eq2 acting on the second medium portion Mp2 to an intensity of an electric field En2 not acting on the second medium portion Mp2 in the second electric field.

In the embodiment, the second electrode 32 is formed such that the thickness t1 is larger than the thickness t2 as shown in FIGS. 2 and 4, thereby implementing the first sensitivity larger than the second sensitivity at the resonance frequency $f_1$. Generally, by further increasing the thickness t1, a density of the electric force lines passing through the liquid Lq on the first medium portion Mp1 can be further increased, and the ratio of the intensity of the electric field Eq1 to the intensity of the electric field En1 can be further increased. However, when the thickness t1 is excessively increased, the number of electric force lines not passing through the liquid Lq on the first medium portion Mp1 increases, and thus the ratio of the intensity of the electric field Eq1 to the intensity of the electric field En1 may decrease. In the embodiment, the thickness t1 is preferably 1.5 times or more, and more preferably 3 times or more the thickness t2. Further, the thickness t1 is preferably 10 times or less the thickness t2, and more preferably 8 times or less the thickness t2.

According to the dielectric heating device 100 of the first embodiment described above, the electrode unit 30 includes the first portion 36 and the second portion 37 sandwiching the first electrode 31 therebetween in the transport direction of the medium Md. The first portion 36 is disposed upstream of the second portion 37 in the transport direction. The first electrode 31 and the second electrode 32 are formed such that the first heating amount representing the heating amount of the medium Md by the first electric field formed between the first electrode 31 and the first portion 36 is larger than the second heating amount representing the heating amount of the medium Md by the second electric field formed between the first electrode 31 and the second portion 37. Accordingly, the heating amount of the medium Md by the electrode unit 30 is larger upstream in the transport direction of the medium Md, and the heating amount of the medium Md by the electrode unit 30 is smaller downstream in the transport direction. Therefore, the medium Md can be prevented from being excessively dried due to the heating by the electrode unit 30 downstream in the transport direction. In addition, since there is no need to measure the moisture content of the medium Md, for example, even when there is no sensor that measures the moisture content provided in the vicinity of the first electrode 31 and the second electrode 32, the medium Md can be prevented from being excessively dried further downstream in the transport direction.

In the embodiment, the electrode unit 30 is configured such that the first sensitivity to the change in the moisture content of the medium Md heated by the electric field formed between the first electrode 31 and the first portion 36 is larger than the second sensitivity to the change in the moisture content of the medium Md heated by the electric field formed between the first electrode 31 and the second portion 37 of the resonance frequency $f_1$ of the electrode unit 30. With such a configuration, the sensitivity to the change in the moisture content of the first medium portion Mp1 can be set larger than the sensitivity to the change in the moisture content of the second medium portion Mp2 of the heating amount of the entire electrode unit 30. Accordingly, for example, by setting the driving frequency $f_0$ to coincide with the resonance frequency $f_1$ when the moisture content of the medium Md is sufficiently large, when the moisture content of the first medium portion Mp1 is relatively large, the heating amount of the first medium portion Mp1 can be further increased, and the moisture content of the first medium portion Mp1 can be further reduced. Conversely, when the moisture content of the first medium portion Mp1 is smaller, the heating amount of the first medium portion Mp1 can be further reduced, and the first medium portion Mp1 can be prevented from being excessively dried. When the medium Md is heated while being transported, since a portion first heated by the electrode unit 30 as the first medium portion Mp1 becomes the second medium portion Mp2 later, a possibility that the second medium portion Mp2 can be dried without excess or deficiency is increased even when the moisture content of the first medium portion Mp1 is relatively large or small. Therefore, the medium Md can be dried more uniformly.

Further, in the embodiment, the thickness t1 of the first portion 36 is larger than the thickness t2 of the second portion 37. Therefore, by setting the thickness t1 larger than the thickness t2, the first heating amount can be easily implemented as being larger than the second heating amount. In addition, by setting the thickness t1 larger than the thickness t2, the first sensitivity can be easily implemented as being larger than the second sensitivity at the resonance frequency $f_1$.

B. Second Embodiment

Figure 6:
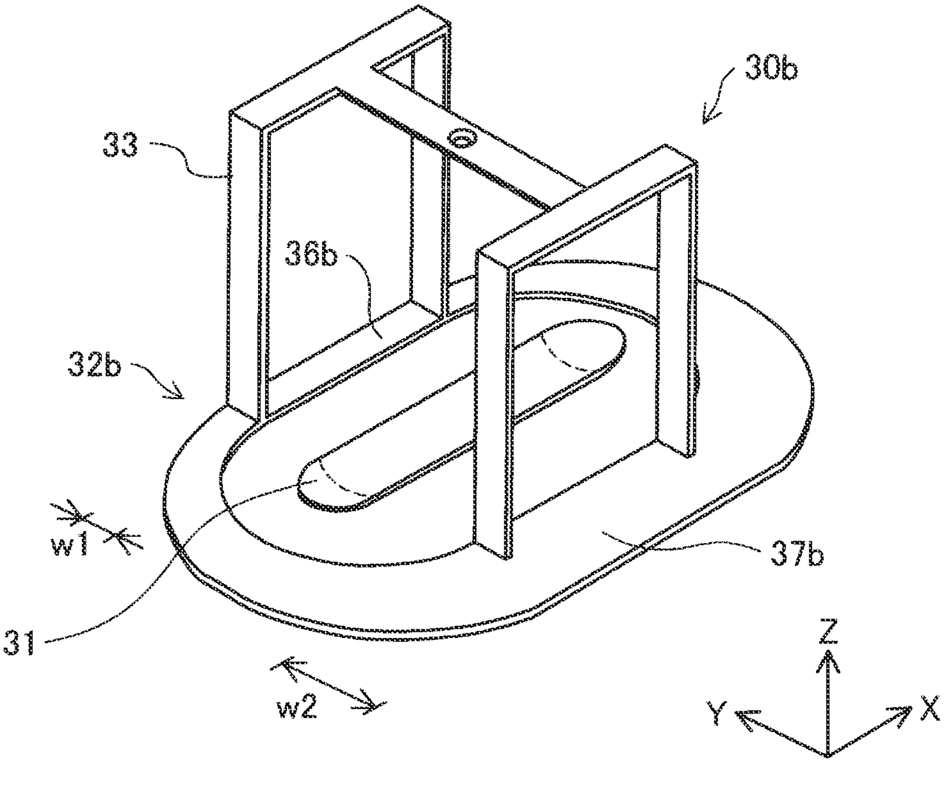
FIG. 6 is a perspective view showing a schematic configuration of an electrode unit according to a second embodiment.

FIG. 6 is a perspective view showing a schematic configuration of an electrode unit 30*b* according to a second embodiment. In FIG. 6, the electric wire 35, the coil 34, and the internal conductor IC1 are omitted. In the embodiment, unlike the first embodiment, a second electrode 32*b* is formed such that a width w1 of a first portion 36*b* in a transport direction is smaller than a width w2 of a second portion 37*b* in the transport direction. Portions of a configuration of the electrode unit 30*b* according to the second embodiment and the dielectric heating device 100, which are not particularly described, are the same as those in the first embodiment.

As described above, in the embodiment, the width w1 is smaller than the width w2. In the present specification, the width w1 indicates an average value of widths of the first portion 36*b*, and the width w2 indicates an average value of widths of the second portion 37*b*. An average value of widths in a certain portion is measured by measuring widths at 10 or more points in the portion and calculating arithmetic mean of the widths. In the embodiment, since the width w1 is smaller than the width w2, the second electrode 32*b* has, when viewed along the Z direction, a non-line-symmetric shape with respect to a straight line along the X direction bisecting the first electrode 31 in the Y direction and a non-point-symmetric shape with respect to a center point of the first electrode 31 in the X direction and the Y direction. In the embodiment, the width w1 is smaller than the width w2, thereby implementing a first heating amount larger than a second heating amount. In the embodiment, the first portion 36*b* and the second portion 37*b* are formed to have the width w1 and the width w2, which are uniform in the X direction, respectively. Further, in the embodiment, the thickness t1 of the first portion 36*b* and the thickness t2 of the second portion 37*b* are the same.

Figure 7:
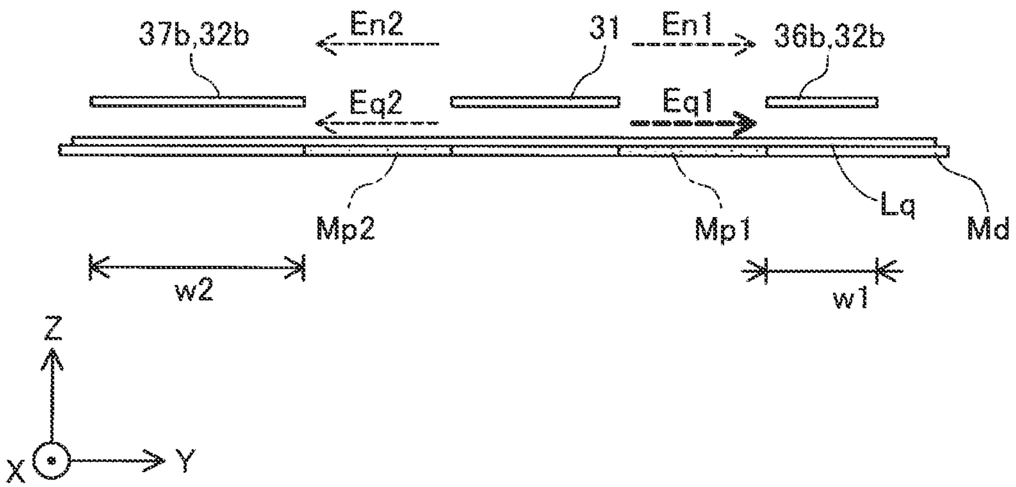
FIG. 7 is a schematic view illustrating a width of a first portion and a width of a second portion.

FIG. 7 is a schematic view illustrating the width w1 of the first portion 36*b* and the width w2 of the second portion 37*b*. FIG. 7 schematically shows a state where the liquid Lq adhering to the medium Md is heated by the electrode unit 30*b* as in FIG. 4 described in the first embodiment. In FIG. 7, similar to FIG. 4, the electric fields Eq1, Eq2, En1, and En2 are indicated by broken lines. As shown in FIG. 7, in the embodiment, an intensity of the electric field Eq1 is larger than an intensity of the electric field Eq2 by setting the width w1 smaller than the width w2. More specifically, since the width w1 is smaller, electric force lines from the first portion 36*b* toward the first electrode 31 and from the first electrode 31 toward the first portion 36*b* are concentrated in a narrower range, and thus the intensity of the electric field Eq1 is further improved. In the embodiment, the width w2 is preferably 1.5 times or more, and more preferably 2 times or more the width w1. Further, the width w2 is preferably 8 times or less, and more preferably 6 times or less the width w1.

In the embodiment, the second electrode 32*b* is formed such that the width w1 is smaller than the width w2, thereby implementing a first sensitivity larger than a second sensitivity at the resonance frequency $f_1$. More specifically, as described above, since the width w1 is smaller, the electric force lines from the first portion 36*b* toward the first electrode 31 and from the first electrode 31 toward the first portion 36*b* are concentrated in a narrower range in the first portion 36*b*, and thus the intensity of the electric field Eq1 with respect to the intensity of the electric field En1 is further improved.

According to the second embodiment described above, the width w1 of the first portion 36*b* is smaller than the width w2 of the second portion 37*b* of the second electrode 32*b*. Therefore, by setting the width w1 smaller than the width w2, the first heating amount can be easily implemented as being larger than the second heating amount. In addition, by setting the width w1 smaller than the width w2, the first sensitivity can be easily implemented as being larger than the second sensitivity at the resonance frequency $f_1$.

C. Third Embodiment

Figure 8:
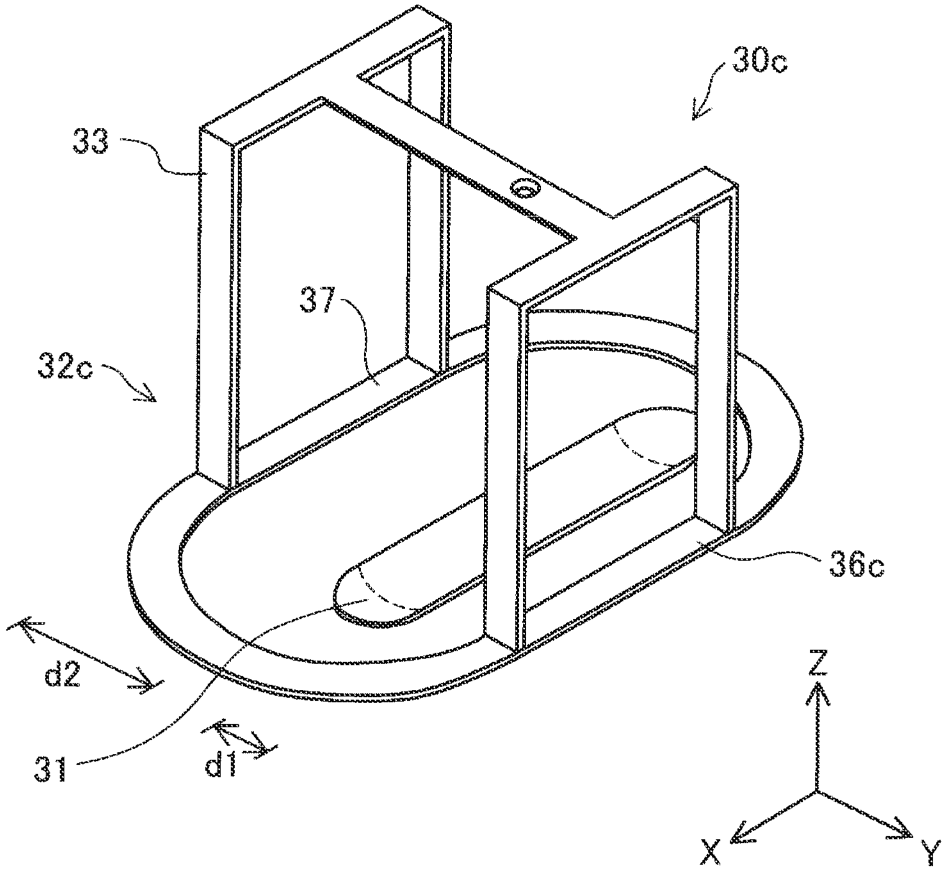
FIG. 8 is a perspective view showing a schematic configuration of an electrode unit according to a third embodiment.

FIG. 8 is a perspective view showing a schematic configuration of an electrode unit 30*c* according to a third embodiment. In FIG. 8, similar to FIG. 2 described in the second embodiment, the electric wire 35, the coil 34, and the internal conductor IC1 are omitted. In the embodiment, unlike the first embodiment and the second embodiment, a first distance d1 between the first electrode 31 and a first portion 36*c* of a second electrode 32*c* in a transport direction is smaller than a second distance d2 between the first electrode 31 and the second portion 37 in the transport direction. Portions of a configuration of the electrode unit 30*c* according to the third embodiment and the dielectric heating device 100, which are not particularly described, are the same as those in the first embodiment.

As described above, in the embodiment, the first distance d1 is smaller than the second distance d2. In the embodiment, the first distance d1 indicates an average value of distances between the first electrode 31 and the first portion 36*c* in the transport direction, and the second distance d2 indicates an average value of distances between the first electrode 31 and the second portion 37 in the transport direction. An average value of distances is measured by measuring distances at 10 or more points and calculating arithmetic mean of the distances. In the embodiment, since the first distance d1 is smaller than the second distance d2, the second electrode 32*c* has, when viewed along the Z direction, a non-line-symmetric shape with respect to a straight line along the X direction bisecting the first electrode 31 in the Y direction and a non-point-symmetric shape with respect to the center point of the first electrode 31 in the X direction and the Y direction. In the embodiment, the first distance d1 is smaller than the second distance d2, thereby implementing a first heating amount larger than a second heating amount. In this way, forming the first electrode 31 and the second electrode 32*c* such that the first heating amount is larger than the second heating amount also includes setting a relative position between the first electrode 31 and the second electrode 32*c* such that the first heating amount is larger than the second heating amount. In the embodiment, the first electrode 31 and the first portion 36*c* are disposed to extend in the X direction and disposed at the constant first distance d1, and the first electrode 31 and the second portion 37 are disposed to extend in the X direction and disposed at the constant second distance d2. In addition, in the embodiment, the thickness t1 of the first portion 36*c* and the thickness t2 of the second portion 37 are the same, and the width w1 of the first portion 36*c* and the width w2 of the second portion 37 are the same.

Figure 9:
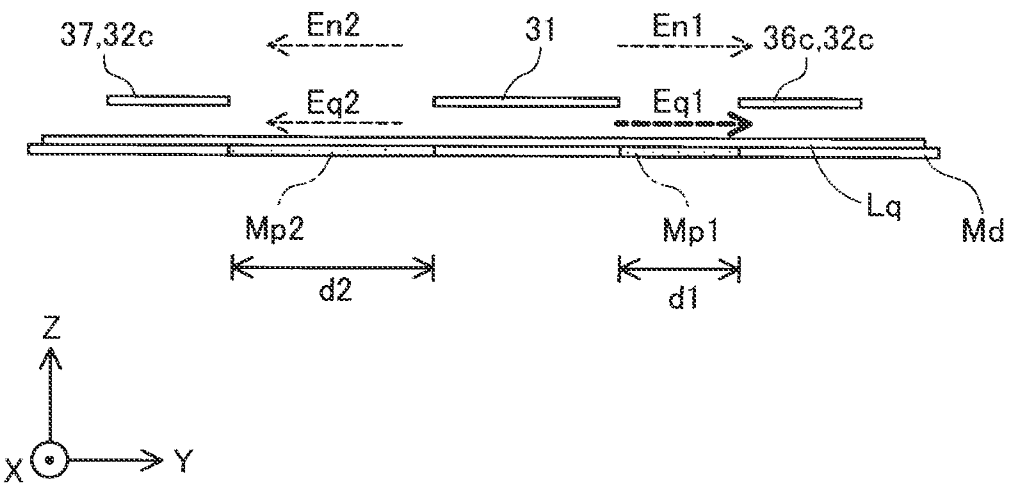
FIG. 9 is a schematic view illustrating a first distance and a second distance.

FIG. 9 is a schematic view illustrating the first distance d1 and the second distance d2. FIG. 9 schematically shows a state where the liquid Lq adhering to the medium Md is heated by the electrode unit 30*c* as in FIG. 4 described in the first embodiment. In FIG. 9, similar to FIG. 4, the electric fields Eq1, Eq2, En1, and En2 are indicated by broken lines. As shown in FIG. 9, in the embodiment, an intensity of the electric field Eq1 is larger than an intensity of the electric field Eq2 by setting the first distance d1 smaller than the second distance d2.

In the embodiment, the first distance d1 is smaller than the second distance d2, thereby implementing a first sensitivity larger than a second sensitivity at the resonance frequency $f_1$. Generally, by further reducing the first distance d1 and further increasing the second distance d2, a density of electric force lines passing through the liquid Lq on the first medium portion Mp1 can be further increased, and a ratio of an intensity of the electric field Eq1 to an intensity of the electric field En1 can be further increased. However, when the first distance d1 is too short with respect to the second distance d2, an area of the first medium portion Mp1 in the XY plane is relatively small with respect to an area of the second medium portion Mp2 in the XY plane, and thus the first sensitivity may be smaller than the second sensitivity. In the embodiment, the first distance d1 is preferably 0.25 times or more, and more preferably 0.35 times or more the second distance d2. Further, the first distance d1 is preferably 0.75 times or less, and more preferably 0.6 times or less the second distance d2.

According to the third embodiment described above, the first distance d1 between the first electrode 31 and the first portion 36*c* is smaller than the second distance d2 between the first electrode 31 and the second portion 37. Therefore, by setting the first distance d1 smaller than the second distance d2, the first heating amount can be easily implemented as being larger than the second heating amount. In addition, by setting the first distance d1 smaller than the second distance d2, the first sensitivity can be easily implemented as being larger than the second sensitivity at the resonance frequency $f_1$.

D. Other Embodiments (D-1) In the embodiments described above, for example, the first heating amount may be implemented as being larger than the second heating amount by combining two or more of increasing the thickness t1 compared to the thickness t2, decreasing the width w1 compared to the width w2, and decreasing the first distance d1 compared to the second distance d2.

(D-2) In the embodiments described above, for example, the first heating amount may be implemented as being larger than the second heating amount by adjusting a thickness of the first electrode 31. For example, the first heating amount may be implemented as being larger than the second heating amount by setting a thickness of half of the first electrode 31 on the +Y direction side larger than a thickness of half of the first electrode 31 on the —Y direction side.

(D-3) In the embodiments described above, the electrode unit 30 is configured such that the first sensitivity is larger than the second sensitivity at the resonance frequency $f_1$, but may not be configured in this way.

(D-4) In the embodiments described above, the first electrode 31 has a boat shape, but may not have the boat shape and may have, for example, a flat plate shape or a rod shape. Further, in the embodiments described above, the first electrode 31 has the oval shape when viewed along the Z direction, but may not have the oval shape and may have, for example, a circular shape, a rectangular shape, or another polygonal shape.

(D-5) In the embodiments described above, the second electrode 32 is disposed to surround the periphery of the first electrode 31 when viewed along the Z direction. In contrast, the second electrode 32 may not be disposed to surround the periphery of the first electrode 31 when viewed along the Z direction. For example, the second electrode 32 may be implemented by two rod-shaped electrodes or two flat plate-shaped electrodes having the same potential and sandwiching the first electrode 31 in the transport direction. In this case, among portions of the electrodes constituting the second electrode 32 that sandwich the first electrode 31 therebetween in the transport direction, a portion located upstream in the transport direction corresponds to the first portion 36, and a portion located downstream in the transport direction corresponds to the second portion 37.

(D-6) In the embodiments described above, for example, the electrode unit 30 may be configured to reciprocate in the X direction. For example, the electrode unit 30 may be supported by a driving unit (not shown) implemented by a belt mechanism or a ball screw mechanism, and may be reciprocated in the X direction.

(D-7) In the embodiments described above, a frequency of 13.56 MHz is used as the driving frequency $f_0$. In contrast, the frequency of 13.56 MHz may not be used as the driving frequency $f_0$, and for example, a frequency of 40.68 MHz, 2.45 GHz, 5.8 GHz, or the like, which is another ISM band, may be used. Further, the driving frequency $f_0$ may not be a high frequency as long as the driving frequency $f_0$ is a frequency at which the liquid adhering to the medium Md can be heated by the electrode unit 30. In this case, the driving frequency $f_0$ is preferably, for example, 100 kHz or more and less than 1 MHz.

E. Other Aspects

The present disclosure is not limited to the embodiments described above, and can be implemented in various forms without departing from the spirit of the present disclosure. For example, the present disclosure can be implemented in the following aspects. To solve a part of or all of problems of the present disclosure, or to achieve a part of or all of effects of the present disclosure, technical features of the embodiment described above corresponding to technical features in the following aspects can be replaced or combined as appropriate. The technical features can be deleted as appropriate unless described as essential in the present specification.

(1) According to an aspect of the present disclosure, a dielectric heating device is provided. The dielectric heating device includes: a transport unit configured to transport a medium in a transport direction; an electrode unit configured to dry the medium transported by the transport unit by dielectric heating, the electrode unit including a first electrode and a second electrode that face the medium; a voltage application unit configured to apply an AC voltage to the first electrode and the second electrode; and a control unit configured to control the transport unit. The second electrode includes a first portion and a second portion that sandwich the first electrode in the transport direction. The first portion is disposed upstream of the second portion in the transport direction. The first electrode and the second electrode are formed such that a heating amount of the medium by an electric field formed between the first electrode and the first portion is larger than a heating amount of the medium by an electric field formed between the first electrode and the second portion.

According to such an aspect, the heating amount of the medium by the electrode unit is larger upstream in the transport direction of the medium, and the heating amount of the medium by the electrode unit is smaller downstream in the transport direction. Therefore, the medium can be prevented from being excessively dried due to the heating by the electrode unit downstream in the transport direction.

(2) In the aspect described above, a distance between the first electrode and the first portion in the transport direction may be smaller than a distance between the first electrode and the second portion in the transport direction. According to such an aspect, by setting the distance between the first electrode and the first portion in the transport direction smaller than the distance between the first electrode and the second portion in the transport direction, the heating amount of the medium by the electric field formed between the first electrode and the first portion can be easily implemented as being larger than the heating amount of the medium by the electric field formed between the first electrode and the second portion.

(3) In the aspect described above, a thickness of the first portion in a facing direction in which the first electrode and the second electrode face the medium may be larger than a thickness of the second portion in the facing direction. According to such an aspect, by setting the thickness of the first portion larger than the thickness of the second portion, the heating amount of the medium by the electric field formed between the first electrode and the first portion can be easily implemented as being larger than the heating amount of the medium by the electric field formed between the first electrode and the second portion.

(4) In the aspect described above, a width of the first portion in the transport direction may be smaller than a width of the second portion in the transport direction. According to such an aspect, by setting the width of the first portion smaller than the width of the second portion, the heating amount of the medium by the electric field formed between the first electrode and the first portion can be easily implemented as being larger than the heating amount of the medium by the electric field formed between the first electrode and the second portion.

(5) In the aspect described above, the electrode unit may be configured such that a sensitivity to a change in a moisture content of the medium heated by the electric field formed between the first electrode and the first portion is larger than a sensitivity to a change in a moisture content of the medium heated by the electric field formed between the first electrode and the second portion at a resonance frequency of the electrode unit. According to such an aspect, the sensitivity to the change in the moisture content of the medium heated by the electric field formed between the first electrode and the first portion can be set to be larger than the sensitivity to the change in the moisture content of the medium heated by the electric field formed between the first electrode and the second portion of the heating amount of the entire electrode unit. Therefore, a possibility of drying the medium more uniformly is improved.

What is claimed is:

1. A dielectric heating device comprising:

a transport unit configured to transport a medium in a transport direction;

an electrode unit configured to dry the medium transported by the transport unit by dielectric heating, the electrode unit including a first electrode and a second electrode that face the medium;

a voltage application unit configured to apply an AC voltage to the first electrode and the second electrode; and a control unit configured to control the transport unit, wherein the second electrode includes a first portion and a second portion that sandwich the first electrode in the transport direction, the first portion is disposed upstream of the second portion in the transport direction, and the first electrode and the second electrode are formed such that a heating amount of the medium by an electric field formed between the first electrode and the first portion is larger than a heating amount of the medium by an electric field formed between the first electrode and the second portion.

2. The dielectric heating device according to claim 1, wherein a distance between the first electrode and the first portion in the transport direction is smaller than a distance between the first electrode and the second portion in the transport direction.

3. The dielectric heating device according to claim 1, wherein a thickness of the first portion in a facing direction in which the first electrode and the second electrode face the medium is larger than a thickness of the second portion in the facing direction.

4. The dielectric heating device according to claim 1, wherein a width of the first portion in the transport direction is smaller than a width of the second portion in the transport direction.

5. The dielectric heating device according to claim 1, wherein the electrode unit is configured such that a sensitivity to a change in a moisture content of the medium heated by the electric field formed between the first electrode and the first portion is larger than a sensitivity to a change in a moisture content of the medium heated by the electric field formed between the first electrode and the second portion at a resonance frequency of the electrode unit.

* * * * *